United States Patent
Holmes et al.

(10) Patent No.: US 9,600,547 B2
(45) Date of Patent: Mar. 21, 2017

(54) SYSTEM AND METHOD OF CONSUMING AND INTEGRATING WITH REST-BASED CLOUD AND ENTERPRISE SERVICES

(71) Applicant: International Business Machines Corporation, Armonk, NY (US)

(72) Inventors: John C. Holmes, Stratham, NH (US); Jeff J. Li, Parkland, FL (US); David S. Sotkowitz, Sharon, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 14/292,425

(22) Filed: May 30, 2014

(65) Prior Publication Data
US 2015/0347539 A1    Dec. 3, 2015

(51) Int. Cl.
G06F 17/00    (2006.01)
G06F 17/30    (2006.01)
G06F 3/0484   (2013.01)
H04L 29/08    (2006.01)

(52) U.S. Cl.
CPC ...... *G06F 17/30563* (2013.01); *G06F 3/0484* (2013.01); *G06F 17/30887* (2013.01); *G06F 17/30893* (2013.01); *H04L 67/02* (2013.01)

(58) Field of Classification Search
None
See application file for complete search history.

(56) References Cited

U.S. PATENT DOCUMENTS

| 8,073,887 B2 | 12/2011 | Baldwin et al. |
| 8,375,358 B2 | 2/2013 | Baldwin et al. |
| 9,329,881 B2 * | 5/2016 | O'Donnell .......... G06F 9/45533 |
| 2010/0293147 A1 * | 11/2010 | Snow ................ G06F 17/30067 |
| | | 707/640 |
| 2013/0046894 A1 | 2/2013 | Said et al. |

(Continued)

FOREIGN PATENT DOCUMENTS

CN    102368217 A    3/2012

OTHER PUBLICATIONS

List of IBM Patents or Patent Applications Treated As Related.
(Continued)

*Primary Examiner* — Hung Le
(74) *Attorney, Agent, or Firm* — Patterson + Sheridan, LLP

(57) ABSTRACT

Techniques are disclosed for consuming and integrating with representational state transfer (REST) based services. In one embodiment, a multiple-step extract, transform, load (ETL) job includes one or more REST steps. Each step in the ETL job performs a particular well-defined task, and the REST step in particular constructs REST requests, invokes REST services, and retrieves REST responses. The REST step may be mapped to a vector of inputs such that multiple REST service calls are made for each of the inputs. Further, a reusable connection may be employed so that one connection can be used to make multiple REST service calls. URLs used to make REST service calls may be dynamically constructed based on input data parameters and ETL job parameters. Additionally, a graphical user interface (GUI) allows users to configure aspects of a REST step.

9 Claims, 13 Drawing Sheets

(56) References Cited

U.S. PATENT DOCUMENTS

| | | | |
|---|---|---|---|
| 2013/0085993 A1* | 4/2013 | Li | G06F 17/30575 707/636 |
| 2013/0219169 A1 | 8/2013 | Del Signore et al. | |
| 2014/0006580 A1 | 1/2014 | Raghu | |
| 2014/0046956 A1 | 2/2014 | Zenger et al. | |
| 2014/0068047 A1* | 3/2014 | Williams | H04L 41/5077 709/223 |
| 2014/0075242 A1* | 3/2014 | Dolinina | G06F 11/3672 714/27 |
| 2014/0222885 A1* | 8/2014 | Mohan | H04L 63/02 709/201 |
| 2014/0317617 A1* | 10/2014 | O'Donnell | G06F 9/45533 718/1 |
| 2014/0372970 A1* | 12/2014 | Broussard | G06F 9/541 717/106 |
| 2015/0271109 A1* | 9/2015 | Bullotta | H04L 69/08 370/466 |
| 2015/0271229 A1* | 9/2015 | Bullotta | H04L 65/60 709/219 |
| 2015/0271271 A1* | 9/2015 | Bullotta | H04L 67/141 709/228 |

OTHER PUBLICATIONS

Holmes et al.: "System and Method of Consuming and Integrating With Rest-Based Cloud and Enterprise Services"; U.S. Appl. No. 14/622,534, filed Feb. 13, 2015.

* cited by examiner

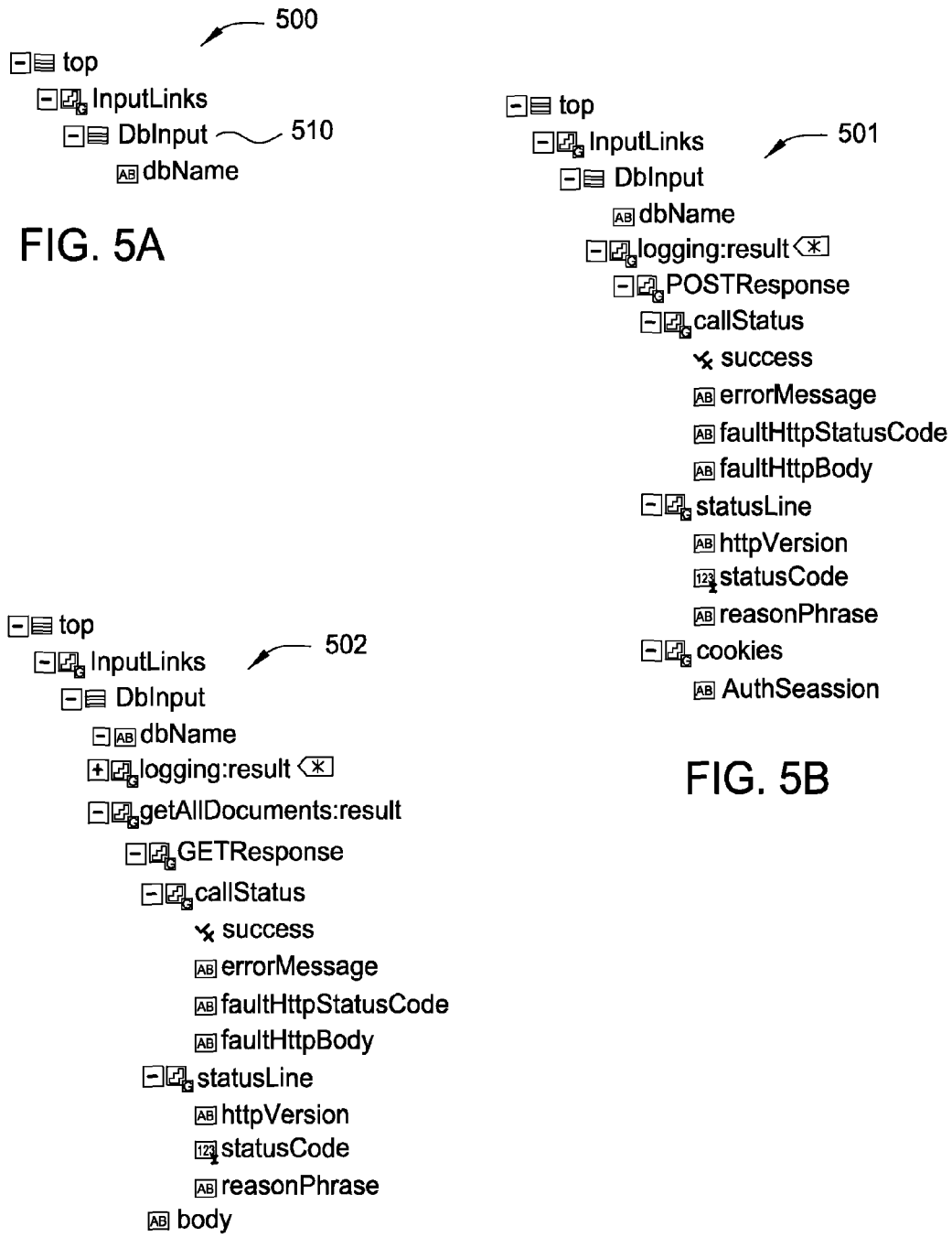

GetDocument Step — 421

| Configuration | Information | Test Data |

General → Security → Request → Response → Mappings

| Field | Value |
|---|---|
| HTTP method: | GET — 605 |
| Reusable connection: | https://jli.cloudant.com/ ▼  Configure.... — 610, 615 |
| URLsuffix: | <dbName>/<docId>  [Insert Parameter...] |
| HTTP version: | HTTP 1.1 ▼ |
| Timeout duration (milliseconds): | 180000 |
| Use proxy server: | ☐ Configure |
| Stop job on error: | ☐ |

A

Configure Reusable Connection — 600

General → Authentication → SSL

| Field | Value |
|---|---|
| Server host name: | jli.cloudant.com  [Insert Parameter...] |
| Server port number: |   [Insert Parameter...] |
| Short description: |   |
| Timeout duration (milliseconds): | 180000 |
| HTTP version: | HTTP 1.1 ▼ |
| Use proxy server: | ☐ Configure |

GetDocument Step

| Configuration | Information | Test Data |

General → Security → Request → Response → Mappings

⟵ 424

☑ Pass the received body to:

Content type:

◉ A text node "body" in the Output schema    application/ ▸   zip ▸

○ A binary node named "body" in the Output schema    ☐ De-compress the received body ○ A node named "body/LobObject" that a downstream LOB-aware stage can process ○ A file whose path is set below Custom headers:                                            Edit as text...

| Name | Default Value |
|------|---------------|
| (Click to add) | |

Custom cookies:                                            Edit as text...

| Name | Default Value |
|------|---------------|
| (Click to add) | |

FIG. 9

SYSTEM AND METHOD OF CONSUMING AND INTEGRATING WITH REST-BASED CLOUD AND ENTERPRISE SERVICES

BACKGROUND

Field of the Invention

The present invention relates to integrating data, and more specifically, techniques for consuming and integrating with representational state transfer (REST) based cloud and enterprise services.

Description of the Related Art

Representational state transfer (REST) is a web design model used by many cloud service providers, enterprises, and social media companies to define interfaces with their services. A cloud service provider may offer scalable computing resources as services over networks, such as provisioning virtual machine instances which can run enterprise applications for customers. Many NoSQL databases and cloud storage service providers use REST to define data integration APIs that may be invoked to extract and load data, among other things.

One approach for integrating with REST services is embodied in the open source RestClient tool, a debugger for RESTful web services, and similar applications, which allow users to make individual REST service calls. However, such applications are not designed for making multiple REST service calls to cloud, enterprise, NoSQL, and/or other REST services, which is often required to implement typical use cases. As used herein, a "use case" defines a sequence of actions that yield an observable result of value, and use cases provide a structure to express functional requirements within the context of business and system processes. For example, one use case may include logging into a NoSQL database, retrieving a number of documents based on document IDs, and retrieving a number of attachments for the documents. In a NoSQL database, stored documents may include documents that encapsulate and encode data using various formats or encodings, such as XML, JSON, URL-encoded, and other documents. Traditional applications such as RESTClient are typically unable to parse and compose such documents. In addition, traditional applications are generally not flexible enough to support the multitude of customizations REST service providers often define in their REST services.

SUMMARY

One embodiment of the invention provides a computer implemented method for executing a computing job having a plurality of steps. The method generally includes, for one or more of the steps subsequent to an input step: receiving events from a previous step; building one or more REST requests based on information collected from the received events; transmitting the REST requests to REST service providers and receiving corresponding REST responses; extracting information from the REST responses; generating new events based on the extracted information; and sending the new events to a next step.

Other embodiments include, without limitation, a computer-readable medium that includes instructions that enable a processing unit to implement one or more aspects of the disclosed method as well as a system configured to implement one or more embodiments of the disclosed method.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 5A-5E illustrate how the input schema for the ETL job of FIG. 4 may be enhanced, according to an embodiment.

FIGS. 6-10 illustrate example GUIs for the tabs shown in FIG. 4.

DETAILED DESCRIPTION

Embodiments disclosed herein provide techniques for consuming and integrating with representational state transfer (REST) based services. The REST services may include cloud, enterprise, and NoSQL REST services. In one embodiment, a multiple-step extract, transform, load (ETL) job includes one or more REST steps. Each step in the ETL job performs a particular well-defined task, such as extracting data from a source, transforming the data to fit operational needs (e.g., composing a particular file such as an XML file), and loading the data into a target. The REST step in particular constructs REST requests, invokes REST services, and retrieves REST responses. For example, an ETL job to load a document to a cloud NoSQL database may include one REST step for logging into the NoSQL database by invoking a particular log-in REST service API which returns an authentication cookie, as well as another REST step which takes as input the authentication cookie and uses the authentication cookie to send multiple documents to the NoSQL database. As another example, an ETL job to for enhancing enterprise data with data from cloud services may include steps to retrieve enterprise data from a data warehouse or database systems, one or more REST steps to log in to the cloud storage system and extract documents, steps to parse and transform the retrieved documents and to integrate data from the documents with enterprise data, and steps to save the transformed results into target database tables such as DB2 tables. Note, although discussed herein with reference to ETL jobs and REST as reference examples of computing jobs invoking a web service interface, one of ordinary skill in the art will recognize that embodiments of the invention may be adapted for a broad variety of computing jobs that need to integrate with services accessed through service interfaces.

In one embodiment, the REST step may be mapped to a vector of inputs such that REST service calls are made for each of the inputs. Continuing the above example, one input vector may describe the multiple documents to be loaded to the NoSQL database, and a REST step may make multiple REST service calls to load each of the documents. In another embodiment, a reusable connection may be employed so that one connection can be used to make multiple REST service calls. URLs used to make REST service calls may also be parameterized so that the URLs are dynamically constructed based on input data parameters and ETL job parameters. Yet another embodiment provides a graphical user interface (GUI) that allows users to specify different aspects of an ETL job and REST steps therein. The GUI may dynamically generate input and output schemas that represent REST invocations based on user configurations of the REST step.

Figure 1:
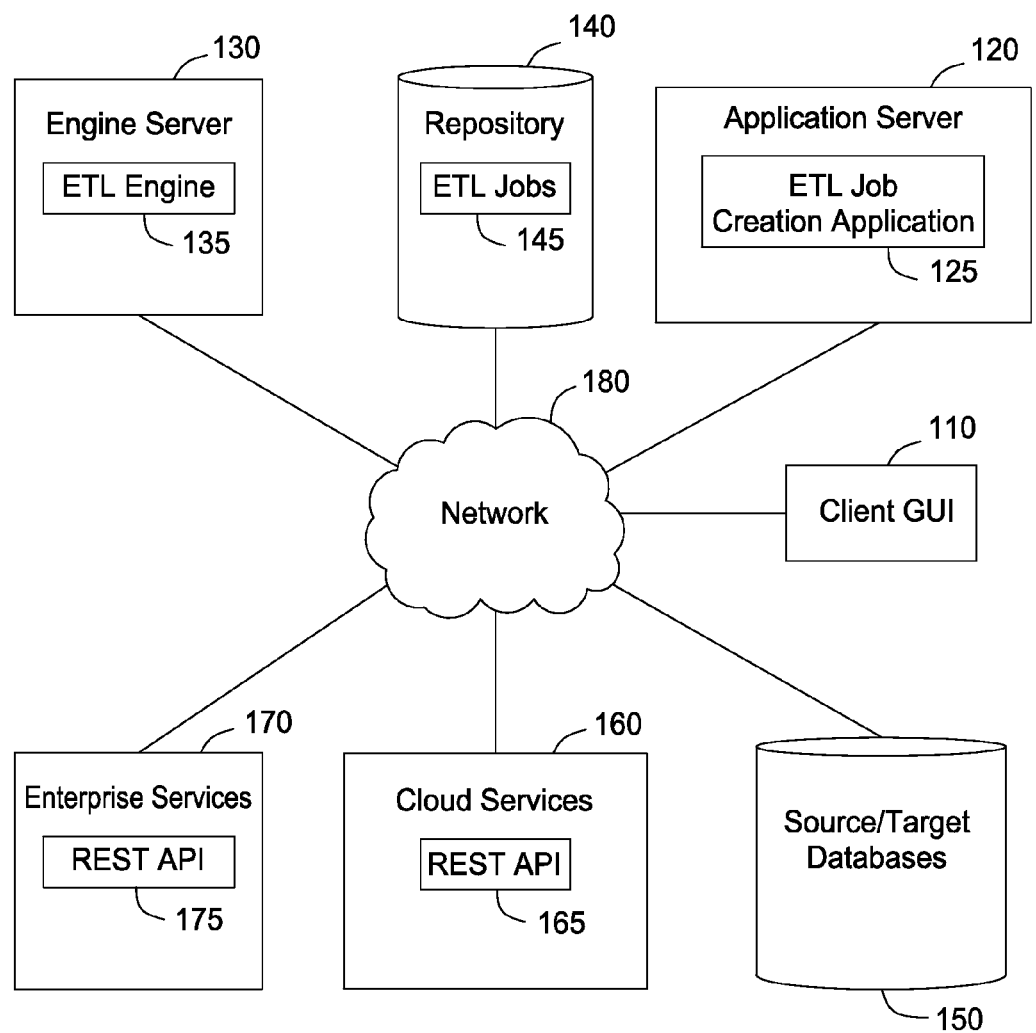
FIG. 1 illustrates a computing environment in which an embodiment may be implemented.

FIG. 1 illustrates a computing environment 100 in which an embodiment may be implemented. As shown, the computing environment 100 includes a client GUI 110, an application server 120, a repository 140, an engine server 130, source/target databases 150, cloud services 160, and enterprise services 170, which are connected over a network 180 (e.g., the Internet). The client GUI 110 provides an interface which a user may use to define and run ETL jobs. In particular, the client GUI 110 may take inputs from the user and request that an ETL job creation application 125 running in the application server 120 create, update, or run an ETL job based on the user inputs. ETL jobs 145 are stored in the repository 140, which may be a database implemented in storage media in one or more storage devices such as hard drives, solid state storage devices, flash memory, etc. Note that one or more of the components illustrated in FIG. 1 may be combined. For example, the engine server 130 and the application server 120 may be implemented with a single computer server.

To execute an ETL job, an ETL engine 135 running in the engine server 130 retrieves the job from the repository 140 based on, e.g., a job ID and performs ETL processes in the job, which may include extracting data from various sources, transform the data to other data, and loading the data into a desired target. For example, particular data may be extracted from the source/target databases 150, transformed into an appropriate format (JSON format) required by one of the cloud services 160, and loaded into that cloud service 160. As discussed in greater detail below, the ETL job may include one or more REST steps which invoke REST APIs 165, 175 provided by the cloud and enterprise services 160, 170 to perform the ETL processes.

Figure 2:
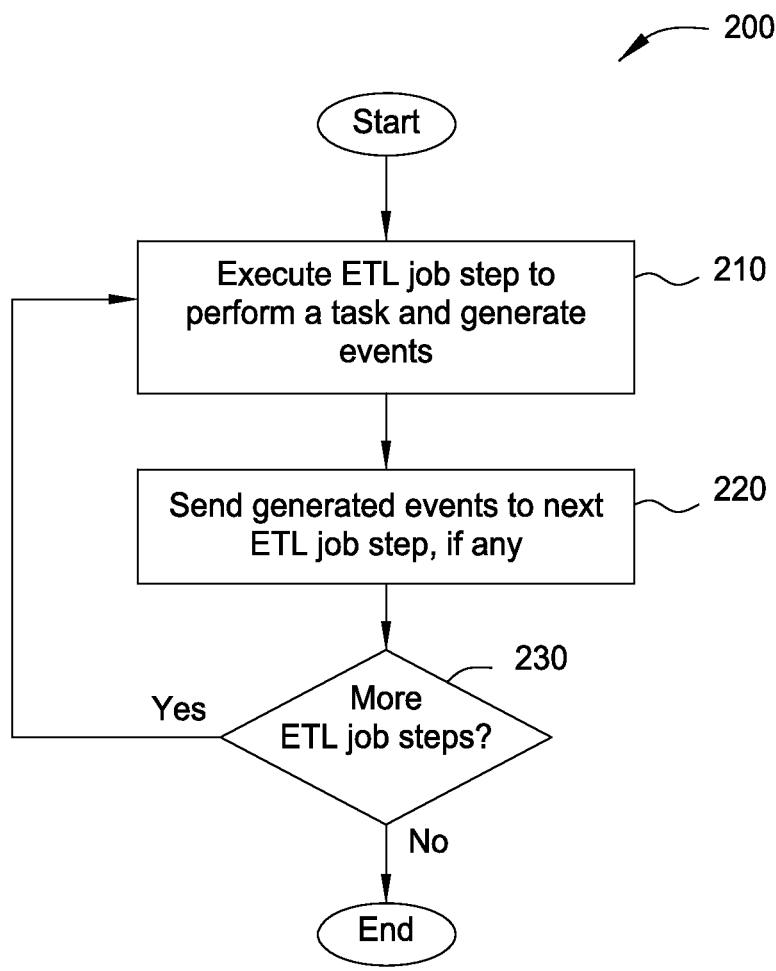
FIG. 2 illustrates a method for executing a multiple-step ETL job, according to an embodiment.

FIG. 2 illustrates a method 200 for executing a multiple-step ETL job, according to an embodiment. As shown, the method 200 begins at step 210, where the ETL engine 135 creates/uses one or many processing units (threads or processes) to perform the one or more operations defined by a step in the ETL job. In one embodiment, a processing unit may be assigned to perform the operations defined by an ETL step. Steps of the ETL job may include steps for extracting data, transforming data, and loading data. For example, one step may be a parsing step that parses data extracted from a data source. Another step may be a composing step that composes data into a format suitable for loading into a data target. Additional examples of steps of an ETL job with a complex schema which includes inputs, outputs, and tasks to be performed at each step is discussed in U.S. Patent Application Publication No. 2013/0191404.

Note, while described herein using a hierarchal schema as an example of a schema that includes inputs, outputs, and tasks to be performed in each step of a job, embodiments of the invention may be adapted for use with a variety of schema structures used to describe inputs, outputs, and/or tasks to be performed as part of job steps. In one embodiment, the input schema describes the data format or structure of the data that an ETL job step will accept and process, while the output schema describes the data format or structure of the data that the step will produce for next step. Further, the output schema of a step may enhance the input schema of the step with the processing result of the step. For example, the processing result of a step for logging in to a cloud database may include an authorization session cookie returned upon successful log in, and such an authorization session cookie may be input to the next step which may then use the cookie to extract or load documents from the cloud database. Each step in the ETL job produces events, such as a stream of events describing retrieved data, which are consumed by a next step. That is, the method 200 is event-driven, with each step consuming a stream of events from a previous step and producing its own stream of events for a next step. A "mapping" within an ETL job step defines the association between source data items (job parameters, local parameters, data items from previous step) and target data items that are needed to execute the ETL job step.

In one embodiment, one or more ETL job steps may be REST steps, discussed in greater detail below. Providing REST steps allows the tasks of invoking REST services to be separated from other tasks (e.g., composing and parsing data payloads), which may be performed in other steps. This divide-and-conquer approach allows users who are designing ETL jobs to focus on one problem at a time. For example, if a cloud service returns documents in XML, the user may add an XML parser step to parse the documents without modifying steps that invoke REST services to retrieve the XML documents.

At step 220, the ETL engine 135 sends events generated at step 220 to the next step, if any. As discussed, a number of steps may be included in an ETL job, including steps for extracting data, transforming data, and loading data. Each step may take certain data as source data items such as job parameters, local parameters, and data items from a previous step and map the source items to target data items that are required to execute the step. The ETL job itself may stretch across cloud and non-cloud data sources/targets. That is, the ETL job may extract, transform, and load data from/to both cloud and non-cloud sources and targets such as cloud storage systems, NoSQL databases, data warehouses, database systems, etc.

As an example of a multiple-step ETL job, an ETL job for loading data into a cloud storage system may include steps to extract relevant data from various sources such as DB2 database tables, steps to transform the extracted data into a REST request payload format suitable for the cloud storage system such as the JSON data form, one or more REST steps configured to log in to the cloud storage system and load the payloads into the cloud storage system, and steps to check REST responses and make sure the load operations are successful.

As another example, an ETL job for extracting and processing data from a cloud storage system and integrating such data with other enterprise data may include one or more REST steps configured to log in to the cloud storage system and extract documents from the cloud storage system, steps to parse and transform the documents received from the cloud storage system, and steps to save the transformed results into database tables such as DB2 tables.

As yet another example, an ETL job for enhancing enterprise data with data from cloud services may include steps to retrieve enterprise data from a data warehouse or database systems, one or more REST steps configured to log in to the cloud storage system and extract documents from the cloud storage system, steps to parse and transform the documents retrieved from the cloud storage system, steps to transform and integrate the enterprise data with the data from the cloud services, and steps to save the transformed results into target database tables such as DB2 tables.

Returning to FIG. 2, the ETL engine 135 determines at step 230 whether there are more steps in the ETL job having tasks pending to be executed and, if so, the method 200 returns to step 210.

Figure 3:
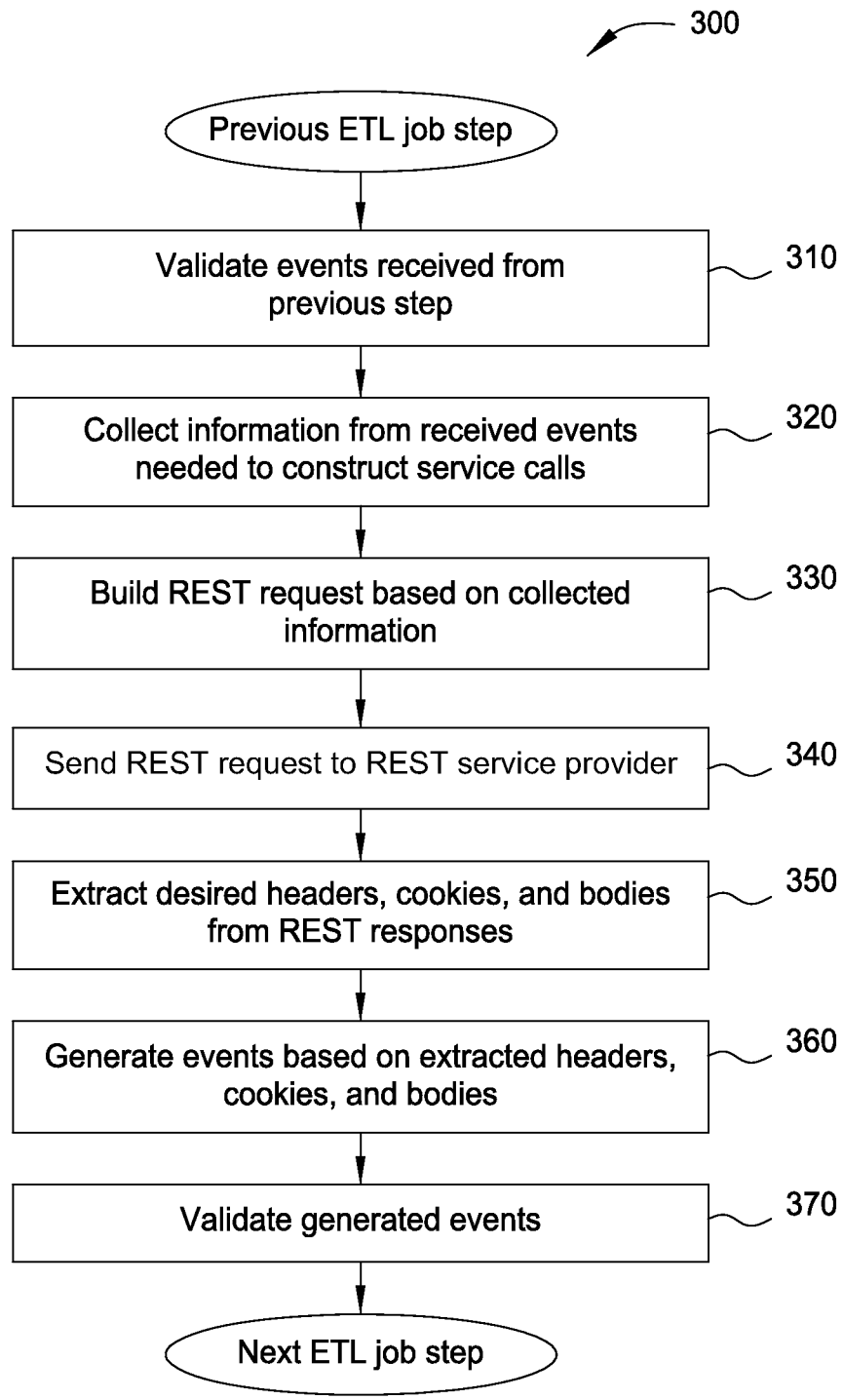
FIG. 3 illustrates a method for executing a REST step in a multiple-step ETL job, according to an embodiment.

FIG. 3 illustrates a method 300 for executing a REST step in a multiple-step ETL job such as that described above with respect to FIG. 2, according to an embodiment. As shown, the method 300 begins at step 310, where events are received from a previous step. As discussed, each ETL job step may generate a stream of events which are then sent to the next ETL job step. Further, the ETL job is event-driven, meaning each job step is triggered by certain events being generated by a previous job step. This triggering may be defined by creating some mappings for the step based on certain inputs. In particular, REST steps may be mapped to a "context node" in an input hierarchical schema, with the REST service being invoked in response to receiving events of the context node. Additional details of hierarchical schemas are described below relative to FIGS. 5A-5E. As used herein, a "context node" generally refers to nodes in a tree of nodes in an input hierarchical schema at which the current ETL job step may be triggered for execution. For example, a REST step that reads data from a cloud database may be mapped to a context node for database names. When events associated with such database names are generated, this particular REST step is triggered. Note that multiple database name events may be received, and, in response, multiple REST service calls may be made in one step to read data from the multiple databases.

At step 320, the ETL engine 135 validates the events received from the previous ETL job step. Validation of the event data is performed based on the hierarchical input schema, discussed above, and is required to ensure that the inputs needed to execute the current ETL job step have been received. For example, one ETL job step which includes accessing a NoSQL database may take as input an authentication cookie, and the ETL engine 135 may validate at step 320 that a received event is a valid authentication cookie event. As another example, REST payloads may be loaded in multiple ways, and the events received at a REST step may include data that is read from sources such as flat files, text input data items, binary input data items, references to large objects in a database system, etc. In such a case, ETL engine 135 may validate that the received event provides data having an expected format.

At step 330, the ETL engine 135 collects information from the received events as needed to construct REST service calls. Once again, the input hierarchical schema and mappings may specify the particular information to be extracted. Continuing the examples from above, the ETL engine 135 may extract the authentication cookie from the event received from the previous step, or extract the data read from the flat files, text input data items, binary input data items, references to large objects in a database system, etc.

At step 340, the ETL engine 135 builds a REST request based on the information collected at step 330. The REST requests may be built based on the input hierarchical schema and mappings, which indicates, among other things, where data for the REST request body comes from, e.g., from a text data item, from a binary data item, from files, from a data item that contains references to large objects in a database, etc. As an example, the ETL engine 135 may invoke a JSON composer to compose a REST body in JSON format based on data retrieved from a text data item. The input hierarchical schema may further indicate headers and cookies to include in the REST request. That is, users are permitted to customize REST request headers and cookies by, e.g., applying default values or mapping the headers or cookies to input data items so that the values of the input data items are in the headers or cookies. This permits the REST request to support different security mechanisms and customized service features.

In one embodiment, the information collected at step 330 may be in the form of a vector, and the ETL engine 135 may build multiple REST requests to, e.g., access different REST services or access a REST service multiple times. For example, the vector may define a list of documents, with each document containing a list of attachments (another vector) in a cloud storage service. In such a case, a first REST step may select the vector for a list of documents as its context node, and build and make REST requests for retrieving the documents identified by the vector one at a time. Then, another REST step may select the vector for a list of attachments as its context node, and build and make REST requests for retrieving the attachments for each document based on document ID and attachment name.

In another embodiment, the information collected at step 330 may include data that is used to construct URLs for the REST service calls. More specifically, the URLs may be parameterized so that the URLs can be constructed from input data items and job parameters that are mapped to different parts of the URL. The job parameters are replaced by the real value of the parameters at runtime. The input data items are mapped to local parameters, whose values are replaced by the values of the data input items. The job parameters and local parameters may then be inserted into appropriate places in the URL to construct the URL for a REST service call.

At step 350, the ETL engine 135 sends the REST request to the REST service provider. As discussed, REST service provides typically define REST APIs which the ETL engine 135 may invoke to call REST services. In one embodiment, the ETL engine 135 may use a reusable connection that can be shared to invoke multiple different REST services hosted on the same web application. As discussed, experience has shown that it is often necessary to make multiple REST service calls in typical use cases defining sequences of actions that yield an observable result of value. The reusable connection is a REST connection that is reused to call different REST services in one or more REST steps that share the reusable connection. The reusable connection is also responsible for passing common cookies among different REST services so that different REST steps are grouped into one session. That is, the reusable connection groups REST steps that are sharing the same connection into one web session which is commonly managed through cookies. The alternative to using a reusable connection would require manually configuring connections for each REST step, which is more labor intensive.

At step 360, the ETL engine 135 extracts desired headers, cookies, and bodies from a REST response that is received from the REST service provider. In one embodiment, the user may also specify which headers and cookies to extract from REST responses, as well as give default values to headers or cookies.

At step 370, the ETL engine 135 validates and parses the headers, cookies, and bodies extracted at step 360. Similar to the validation of step 310, the ETL engine 135 validates the headers, cookies, and bodies to ensure that the REST response has returned expected data. For example, the ETL engine 135 may validate during a logging in REST step that an authentication cookie has been returned in the REST body. The ETL engine 135 may further parse the headers, cookies, and bodies to extract output data items specified in the output hierarchical schema. Continuing the previous example, the ETL engine 135 may extract the authentication cookie from the REST body so that it can be used in a later ETL job step. As another example, the REST body may be in JSON format and include a list of document IDs of documents stored in a cloud database. In such a case, the ETL engine 135 may parse the REST body to extract the document IDs. In general, users may be allowed to map headers, cookies, and bodies to output data items so that information can be extracted from any part of REST services.

At step 380, the ETL generates events based on the extracted REST response headers, cookies, and bodies. Thereafter, the events may be consumed by a next step in the ETL job. For example, if the REST step extracts data from a cloud database, the next step may parse the data and transform the data to another format which can be loaded to another database.

Figure 4:
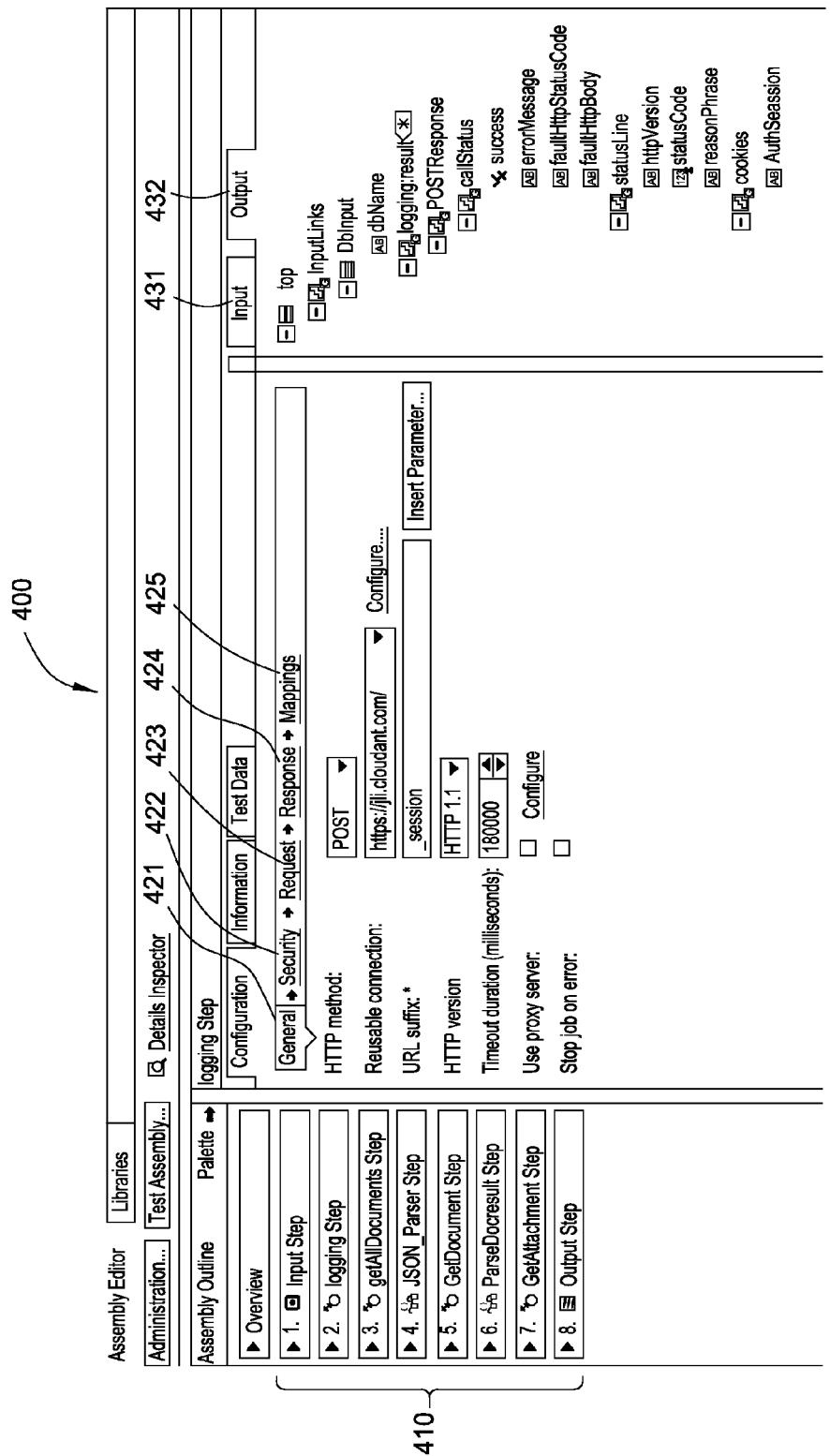
FIG. 4 illustrates an example ETL job and a GUI for designing ETL jobs.

FIG. 4 illustrates an example ETL job and a GUI 400 for designing ETL jobs. This example ETL job extracts documents and document attachments from a cloud database. Illustratively, the GUI 400 displays a listing of steps 410 of the ETL job. The steps 410 include an "Input Step" which contains (or imports) initial inputs for the ETL job such as database names in this example, a "logging Step" which logs into cloud databases, and a "getallDocuments" step which retrieves a list of documents in the cloud databases. This example assumes that the data that is received from the cloud databases includes JSON documents that list document IDs, keys, and versions of the documents stored in the cloud databases. As shown, the steps 410 further include a "JSON_Parser" step that parses the JSON documents for document IDs so that documents and attachments can be retrieved from the cloud databases, a "GetDocument" step that loops through document IDs and retrieves the documents one at a time based on the document IDs, a "ParseDocResult" step that parses the retrieved documents to construct a hierarchical representation of the documents retrieved at the "GetDocument" step, and a "GetAttachment" step that loops through the document IDs and retrieves attachments for each document.

As shown, the GUI 400 is also configured to displays multiple tabs, including a general tab 421, a security tab 422, a request tab 423, a response tab 424, a mapping tab 425, an input tab 431, and an output tab 432. The input and output tabs 431-432 display input and output hierarchical schemas which describe the inputs and outputs. Each ETL job step takes the output schema from the previous step and enhances this schema with data items that describe the processing results of the current step. FIG. 5 illustrates example input/output schemas. The general tab 421, the security tab 422, the request tab 423, the response tab 424, and the mapping tab 425, are examples of tabs for configuring a REST step in an ETL job and are discussed in greater detail below with respect to FIGS. 6-10.

Figures 5D, 5E:
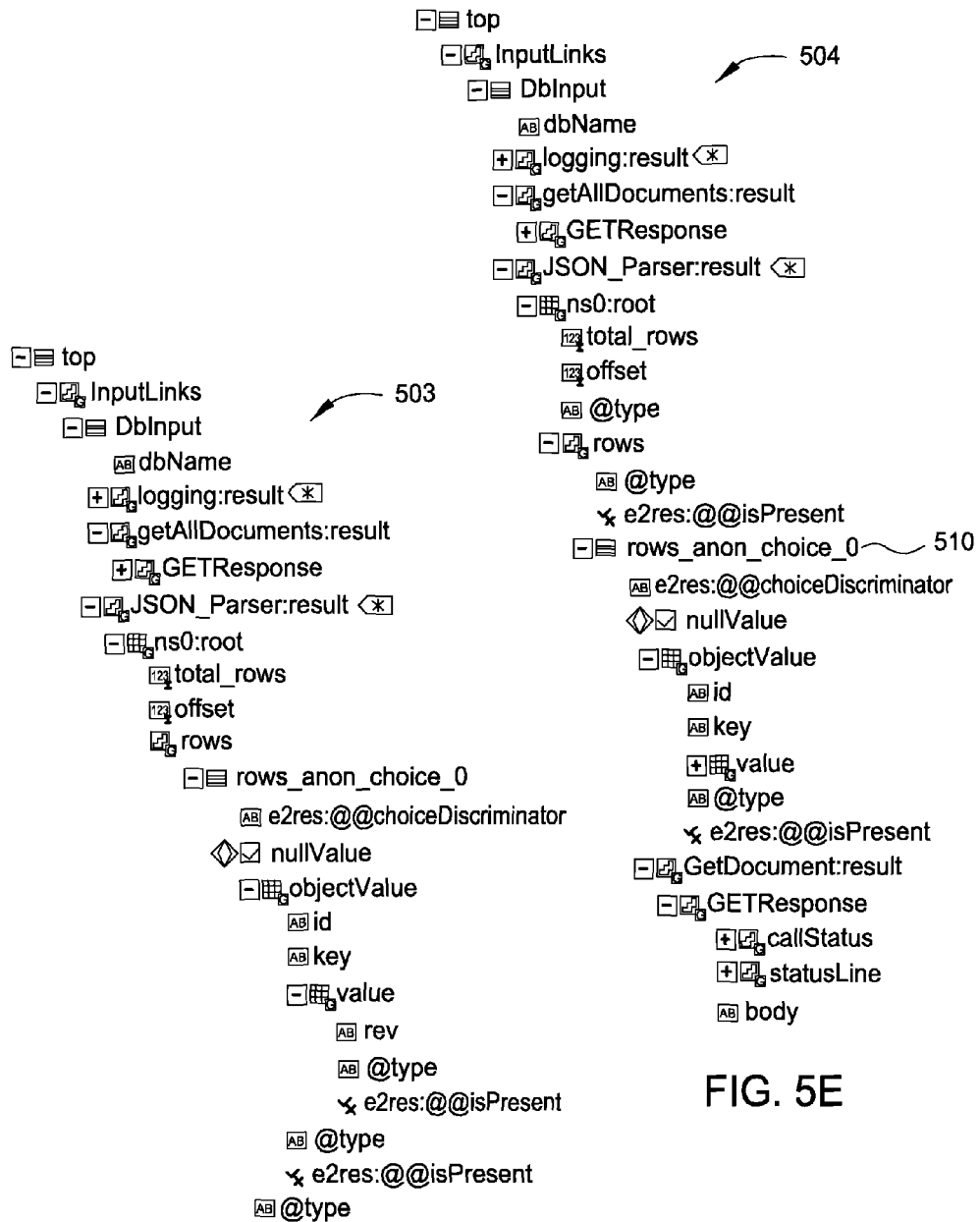

FIGS. 5A-5E illustrates how the input schema 500 for the ETL job may be enhanced after each ETL job step with data items that describe the processing results of the ETL job step, according to an embodiment. As shown in FIG. 5A, the "Input" step of the ETL job of FIG. 4 specifies database names (dbName) that documents are to be retrieved from. At the "Logging Step" of the ETL job, the context node "DbInput" 510 is executed. As discussed, a "context node" or other nodes are tree nodes in the input hierarchical schema 500 at which the current step may be triggered for execution. For example, at "DbInput" 510 in particular, one or more REST service calls may be made to log in to databases specified in the dbName. As discussed, inputs such as dbName may be vectors, and such cases there may be multiple databases and multiple corresponding REST service calls made to log in to the databases. After the "Logging Step" is performed, the input schema 500 is enhanced to output schema 501 with data items that describe the processing status and various returned values from the REST service calls (e.g., an authorization session cookie), as shown in FIG. 5B. The output schema 501 of the step "Logging Step" becomes the input schema of the step "getAllDocuments." These inputs are then fed into the next step, namely "getAllDocuments," which is also executed at the context node "DbInput" to retrieve documents in the one or more databases specified by dbName. The input schema 501 is once again enhanced to the output schema 502 for the step "getAllDocuments," shown in FIG. 5C. The output schema 502 of the step "getAllDocuments" becomes the input schema of the step "JSON_Parsing". The "JSON_Parsing" step is then executed at the context node "DbInput" to parse the REST documents, returned from the REST step "getAllDocuments." As shown in FIG. 5D, the input schema 502 is enhanced to the output schema 503 for "JSON_Parsing " or the input schema for the step "GetDocument", which includes a "rows_anon_choice_0" vector which may contain document information such as document IDs and keys in the cloud databases. The step "GetDocument" is then executed at the context node "rows_anon_choice_0" 510 so that one REST service call is made for each document in the cloud databases to retrieve the document based on its document ID. The output schema 504 of the "GetDocument" step, including the GetDocument result, is shown in FIG. 5E.

Figure 7:
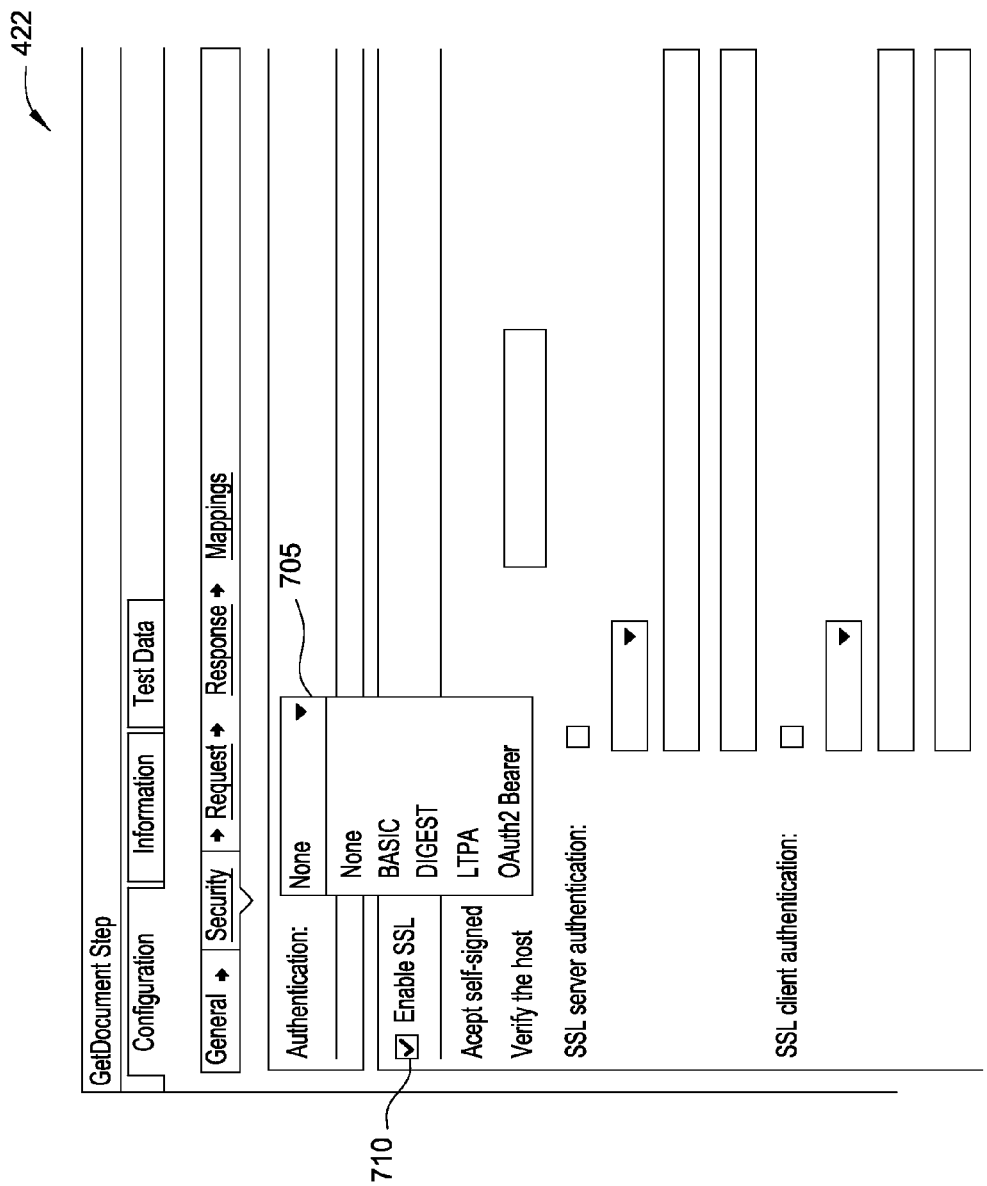
Figure 8:
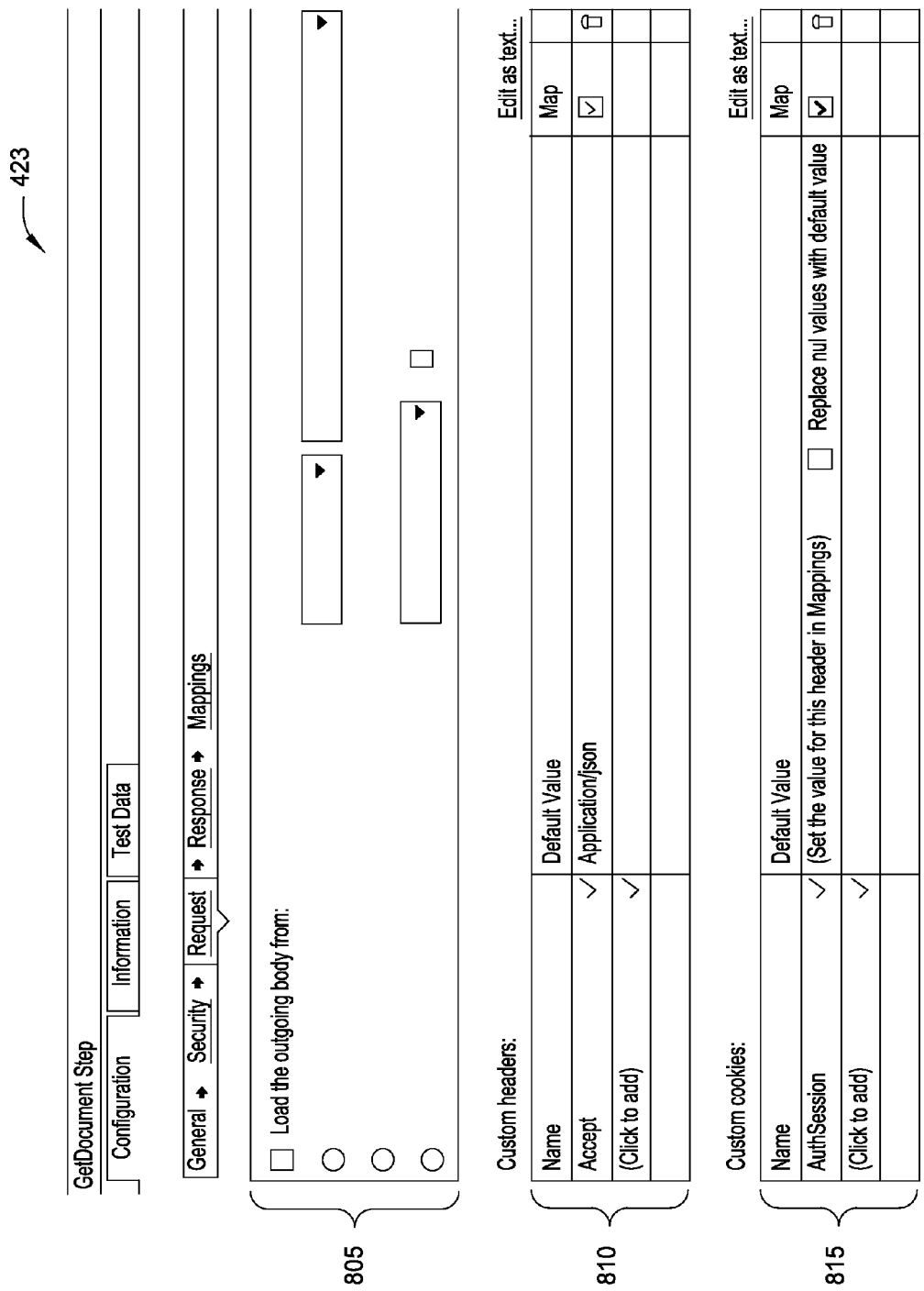
Figure 10:
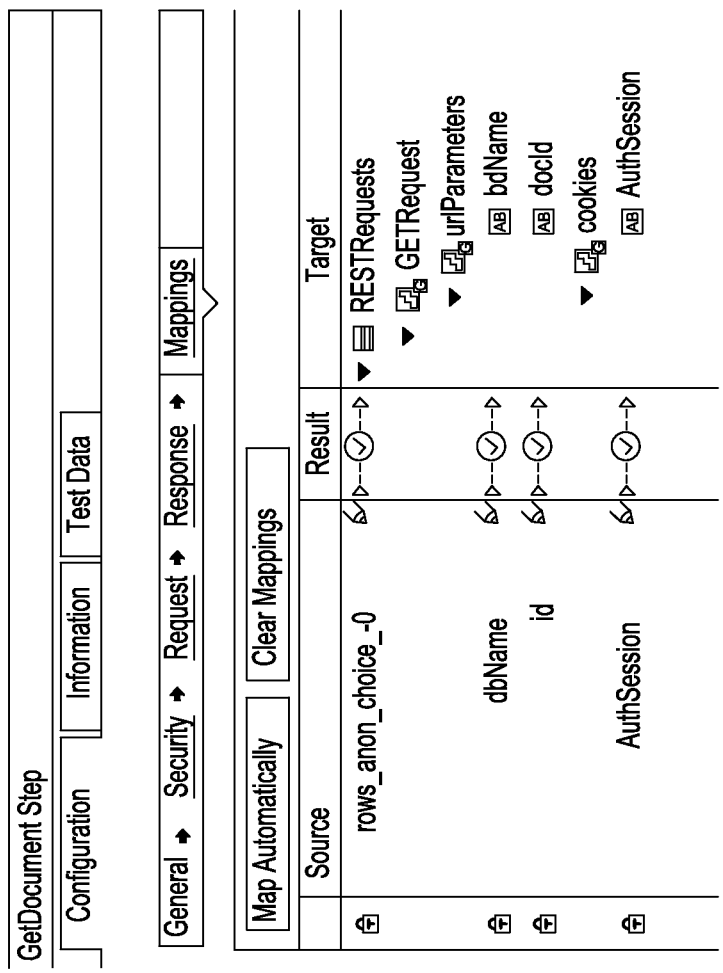

FIGS. 6-10 illustrate example GUIs for the general tab 421, the security tab 422, the request tab 423, the response tab 424, and the mapping tab 425. As shown in panel A of FIG. 6, the general tab 421 includes an interface for specifying, among other things, the HTTP method 605 used in the REST request, whether and which reusable connection 610 to use in making the REST request, and a URL suffix 615. As discussed, the reusable connection is a single connection reused to call different REST services by multiple ETL job steps, and the URL may further be parameterizable such that the URL used can be dynamically generated based on job parameters and input data items. Illustratively, the URL may have a suffix that includes a "dbName" and a "docId," which are mapped to input values received at runtime. Panel B of FIG. 6 illustrates a GUI for configuring reusable connections. As shown in FIG. 7, the security tab 422 includes an interface for specifying, among other things, an authentication type 705 and whether SSL is enabled 710. The security tab 422 may generally allow the user to set up authentication mechanisms and SSL verifications. As shown in FIG. 8, the request tab 423 includes an interface for specifying what data the REST request body is loaded with 805, as well as custom headers and cookies 810, 815. As shown in FIG. 9, the response tab 424 includes an interface for specifying how to extract information from REST responses, including how to extract the received body of a REST response and the header and cookie of the REST response. As shown in FIG. 10, the mapping tab includes an interface for users to select the context node for executing the REST step, as well as the mapping of input data items to REST request data items. Illustratively, the "rows_anon_choice_0" context node, discussed above, has been chosen to execute the REST step and the REST service is called once for each document ID in the "rows_anon_choice_0" vector.

Figure 11:
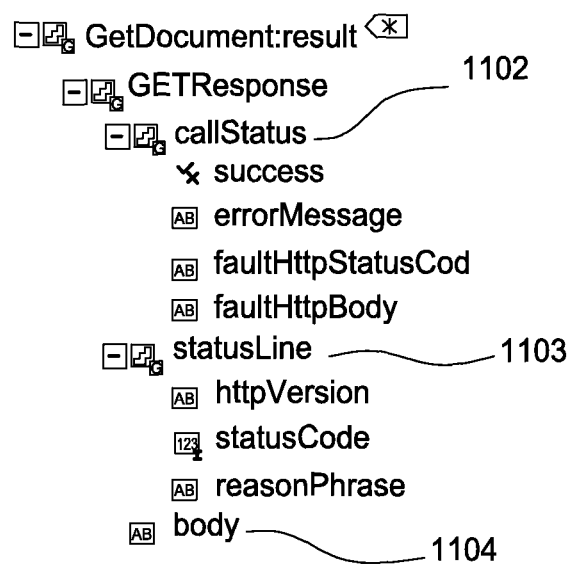
FIG. 11 illustrates an example output schema.

FIG. 11 illustrates an example output schema 1101. The output schema 1101 may be automatically generated from an input schema and the data fields that describes pieces of information that the user wishes to extract from REST responses, as specified via the response tab 424. For example, REST response body 1104 is included in the output schema 1101. Illustratively, REST call status and error messages may be tracked via a "callStatus" 1102 group of nodes in the output schema 1101, while a "statusLine" 1103 group of nodes model the status code found in typical REST responses. Such output provides information on whether the REST service call was successful or not.

Figure 12:
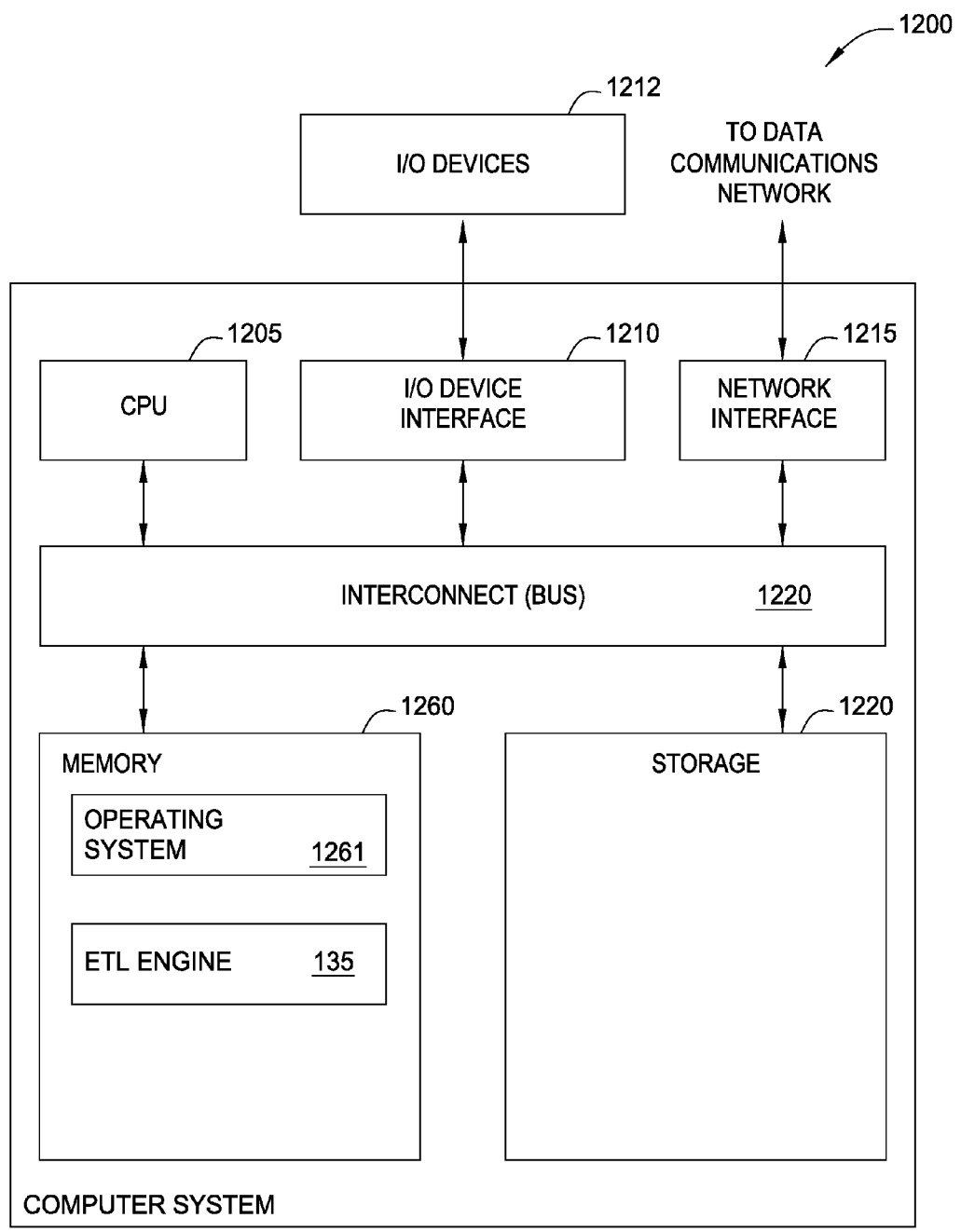
FIG. 12 illustrates a system in which one or more of the application server or the engine server shown in FIG. 1 may be implemented.

FIG. 12 illustrates a system 1200 in which one or more of the application server 120 or engine server 130 may be implemented. As shown, the system 1200 includes, without limitation, a central processing unit (CPU) 1205, a network interface 1215, an interconnect 1220, a memory 1260, and storage 1230. The system 1200 may also include an I/O device interface 1210 connecting I/O devices 1212 (e.g., keyboard, display and mouse devices) to the system 1200.

The CPU 1205 retrieves and executes programming instructions stored in the memory 1260. Similarly, the CPU 1205 stores and retrieves application data residing in the memory 1260. The interconnect 1220 facilitates transmission, such as of programming instructions and application data, between the CPU 1205, I/O device interface 1210, storage 1230, network interface 1215, and memory 1260. CPU 1205 is included to be representative of a single CPU, multiple CPUs, a single CPU having multiple processing cores, and the like. And the memory 1260 is generally included to be representative of a random access memory. The storage 1230 may be a disk drive storage device. Although shown as a single unit, the storage 1220 may be a combination of fixed and/or removable storage devices, such as magnetic disk drives, flash drives, removable memory cards or optical storage, network attached storage (NAS), or a storage area-network (SAN). Further, system 1200 is included to be representative of a physical computing system as well as virtual machine instances hosted on a set of underlying physical computing systems. Further still, although shown as a single computing system, one of ordinary skill in the art will recognized that the components of the system 1200 shown in FIG. 12 may be distributed across multiple computing systems connected by a data communications network.

As shown, the memory 1260 includes an operating system 1261 (e.g., Microsoft's Windows®) and an ETL engine 135. Note, in the application server 120, the memory 1260 would include the ETL job creation application 125 discussed above, which is configured to allow a multiple-step ETL job with REST steps to be created via a GUI. The ETL engine 135 is configured to load and execute ETL jobs. In one embodiment, the ETL engine 135 may execute ETL jobs according to the method 200 discussed above with respect to FIG. 2 and to execute REST steps according to the method 300 discussed above with respect to FIG. 3.

Advantageously, techniques disclosed herein permit consumption and integration with REST-based cloud and enterprise services using a multiple-step ETL job. The ETJ job may include one or more REST steps, thereby allowing users to create a job that invokes a number of related REST service calls. A reusable connection may be employed so that a connection can be shared to invoke multiple different REST services hosted on the same web application. Further, the URL for a REST service may be parameterized and constructed dynamically. In addition, an intuitive GUI is presented that allows users to configure the REST step in various ways so that, among other things, the REST step can be configured to customize headers, cookies, and content types and to support customized requirements that REST service providers may define in their REST services.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. As discussed, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., ETL job creation application 125) or related data available in the cloud. For example, the ETL job creation application 125 could execute on a computing system in the cloud and be used to design and modify ETL jobs with one or more REST steps.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a memory, wherein the memory includes an application program configured to perform operations for executing an extract, transform, and load (ETL) job having a plurality of steps, the operations comprising, for one or more of the steps subsequent to an input step:
receiving events from a previous step,
building one or more representational state transfer (REST) requests based on information collected from the received events,
transmitting the REST requests to REST service providers and receiving corresponding REST responses,
extracting information from the REST responses,
generating new events based on the extracted information, and
sending the new events to a next step;
wherein the one or more steps includes at least one of a step of extracting data from a source system and loading data to a target system.

2. The system of claim 1, wherein one or more input data items of the one or more steps are mapped to context nodes, and wherein the building of the one or more REST requests is triggered by receiving one or more events for the context nodes.

3. The system of claim 1, wherein the one or more steps include at least two steps that share a reusable connection used to invoke multiple different REST services hosted on a given web application.

4. The system of claim 1, wherein the REST request uses a URL which is dynamically generated based on at least one of the received event and parameters of the computing job.

5. The system of claim 1, wherein the REST request includes at least one of headers and cookies generated based on the received events or parameters of the computing job.

6. The system of claim 1, wherein the one or more steps are configured by a user via a multi-tab graphical user interface (GUI) which permits each step of the computing job to be configured independently of other steps of the computing job.

7. The system of claim 6, wherein the GUI provides options for loading REST request payloads from and saving REST response payloads to at least one of a flat file, a text input data item, a binary input data item, and a large object in a database.

8. The system of claim 1, wherein the operations for the one or more steps further include:
validating the received events; and
validating the information extracted from the REST responses.

9. A computer program product for executing an extract, transform, and load (ETL) job having a plurality of steps, the computer program product comprising:
a computer-readable storage medium having computer-readable program code embodied therewith for one or more of the plurality of steps subsequent to an input step, the computer-readable program code comprising:

computer-readable program code configured to receive events from a previous step of the plurality of steps;

computer-readable program code configured to build one or more representational state transfer (REST) requests based on information collected from the received events; and computer-readable program code configured to transmit the REST requests to REST service providers and receiving corresponding REST responses;

computer-readable program code configured to extract information from the REST responses;

computer-readable program code configured to generate new events based on the extracted information; and computer-readable program code configured to send the new events to a next step of the plurality of steps;

wherein the one or more steps includes at least one of a step of extracting data from a source system and loading data to a target system.

\* \* \* \* \*